United States Patent
Deng et al.

(10) Patent No.: US 10,255,375 B2
(45) Date of Patent: Apr. 9, 2019

(54) APPLYING A VISUALIZATION TECHNIQUE TO A PARTICULAR SECTION OF A CONTENT ITEM BASED UPON A RELATIVE RANKING

(71) Applicant: International Business Machines Corporation, Armonk, NY (US)

(72) Inventors: Zhi Guo HD Deng, Beijing (CN); Guo Kang Fu, Beijing (CN); Dan Li, Beijing (CN); Su Liu, Austin, TX (US); Xing Hua Wang, Beijing (CN); Rui Li Xu, Beijing (CN); Ya Juan Zhai, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/633,160

(22) Filed: Jun. 26, 2017

(65) Prior Publication Data
US 2018/0373802 A1 Dec. 27, 2018

(51) Int. Cl.
G06F 17/30 (2006.01)
G06Q 50/00 (2012.01)
G06F 3/0482 (2013.01)

(52) U.S. Cl.
CPC ...... *G06F 17/30905* (2013.01); *G06F 3/0482* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,122,989 B1 | 9/2015 | Morris et al. | |
| 9,129,008 B1* | 9/2015 | Kuznetsov | G06F 17/30038 |
| 9,235,625 B2 | 1/2016 | Lewis et al. | |
| 9,424,319 B2 | 8/2016 | Fan et al. | |
| 2007/0038646 A1 | 2/2007 | Thota | |
| 2007/0234209 A1* | 10/2007 | Williams | G06F 3/04842 715/700 |
| 2008/0249798 A1 | 10/2008 | Tulshibagwale | |
| 2012/0131013 A1 | 5/2012 | Hobbs et al. | |
| 2013/0086078 A1 | 4/2013 | Malleshaiah | |
| 2014/0372873 A1* | 12/2014 | Leung | G06F 17/3089 715/243 |
| 2015/0135057 A1 | 5/2015 | Metcalf et al. | |

OTHER PUBLICATIONS

Hsu, C.F. et al., "Ranking Comments on the Social Web," in IEEE Int'l Conf. on Computational Science and Engineering, 2009, CSE'09, vol. 4, pp. 90-97, 2009.
Al-Qurishi, M. et al., "Selecting the best open source tools for collecting and visualzing social media content," In IEEE 2nd World Sym. on Web Applications and Networking (WSWAN), Mar. 2015, pp. 1-6.

* cited by examiner

*Primary Examiner* — Asher D Kells
(74) *Attorney, Agent, or Firm* — Cuenot, Forsythe & Kim, LLC

(57) ABSTRACT

Rendering a content item of a social networking system can include dividing, using a processor, a content item into a plurality of sections, determining, using the processor, a score for each of the plurality of sections, and applying, using the processor, a visualization technique to a selected section of the content item based upon the scores of the plurality of sections.

18 Claims, 4 Drawing Sheets

APPLYING A VISUALIZATION TECHNIQUE TO A PARTICULAR SECTION OF A CONTENT ITEM BASED UPON A RELATIVE RANKING

BACKGROUND

This disclosure relates to social networking systems and, more particularly, to rendering content items of a social networking system.

The amount of information that is available online continues to grow exponentially each year. Much of this information is generated in the form of Web pages that are distributed or shared through social networking systems. The amount of content shared within social networking systems is often so large that it is not possible for a user to read all of the content shared with, or otherwise made available to, that user.

Choosing not to read a particular content item may cause the user stress and/or anxiety that the user is missing out on important or useful information. This may be particularly true in situations where the user is using social media to stay up-to-date with one's career, for example. Attempting to read most of the available content, however, requires significant amounts of time to manually sort through content that is of little or no value in order to locate content of greater value.

SUMMARY

One or more embodiments are directed to methods for rendering a content item of a social networking system. In one aspect, a method can include dividing, using a processor, a content item into a plurality of sections, determining, using the processor, a score for each of the plurality of sections, and applying, using the processor, a visualization technique to a selected section of the content item based upon the scores of the plurality of sections.

One or more embodiments are directed to systems for rendering a content item of a social networking system. In one aspect, a system includes a memory configured to store program code and a processor coupled to the memory. The processor, in response to executing the program code, is configured to initiate operations including dividing a content item into a plurality of sections, determining a score for each of the plurality of sections, and applying a visualization technique to a selected section of the content item based upon the scores of the plurality of sections.

One or more embodiments are directed to a computer program product for rendering a content item of a social networking system. In one aspect, the computer program product includes a computer readable storage medium having program code stored thereon. The program code is executable by a processor to initiate operations. The operations include dividing, using the processor, a content item into a plurality of sections, determining, using the processor, a score for each of the plurality of sections, and applying, using the processor, a visualization technique to a selected section of the content item based upon the scores of the plurality of sections.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
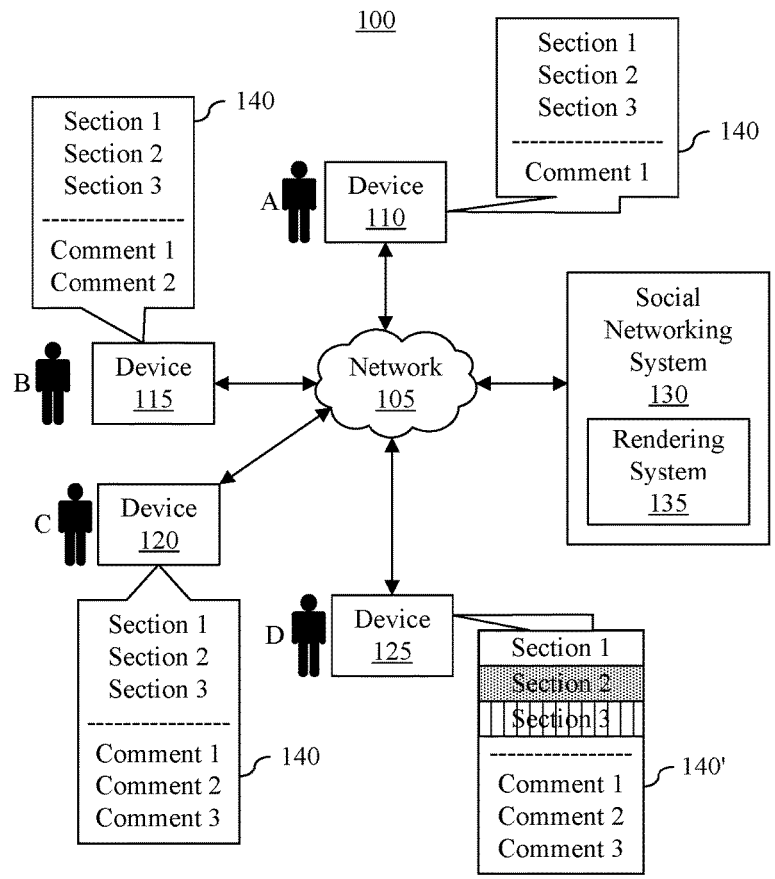
FIG. 1 is an example of a network computing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to social networking systems and, more particularly, to rendering content items of a social networking system. One or more embodiments described within this disclosure are directed to methods, systems, and computer program products capable of analyzing content of a social networking system based upon user comments for the content. A system, for example, is capable of analyzing a content item of a social networking system to divide the content item into a plurality of different sections. The system is capable of scoring each of the different sections of the content item independently of the others to identify those sections of the content item deemed of greater value than the others.

In one or more embodiments, the system is capable of rendering the content item by applying different visualization techniques to one or more or all of the respective sections of the content item based upon the score of each respective section. For example, the sections may be ranked with different visualization techniques being applied to the different sections based upon the ranking. The system may perform the rendering operations, e.g., the application of visualization techniques, dynamically. For example, in response to a request to access a content item of a social networking system, the system is capable performing the operations described herein in real time or in substantially real time. The system, in real time, is capable of applying the different visualization techniques to the different sections of the content item based upon the score and/or ranking of each respective section.

In particular embodiments, the system uses comments for the content item to determine the score of the sections. As an illustrative example, the system is capable of correlating the comments for the content item with the different sections of the content item. Thus, the contribution of a comment toward the score of a particular section may vary based upon how closely related the comment is to the section of the content item.

In one or more embodiments, the system is capable of scoring the sections by applying a subject matter domain weight. Each user that contributes a comment may have one or more subject matter domain weights stored as part of a user profile within a data structure. The subject matter domain weights for a user may be subject matter domain specific. In one example, the system determines the contribution of a comment toward the score of a section of the content item based upon a combination of the relatedness of the comment to the section and the subject matter domain weight of the user that made the comment. As noted, the subject matter domain weight for the user may vary from one subject matter domain to another. Thus, the subject matter domain weight applied to a comment from for a given user may differ based upon the particular subject matter domain of the particular section to which the comment is being applied.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a network computing system 100 in which the inventive arrangements may be implemented. Network computing system 100 contains a network 105, devices 110, 115, 120, and 125, and social networking system 130. The noted elements are interconnected, e.g., communicatively linked, by network 105.

Network 105 is the medium used to provide communication links between various devices and data processing systems connected together within network computing system 100. Network 105 may include connections, such as wired communication links, wireless communication links, or fiber optic cables. Network 105 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Devices 110, 115, 120, and 125 are capable of coupling to network 105 via wired and/or wireless communication links. In one or more embodiments, devices 110-125 are client devices. As defined herein, the term "client device" means a processing system including at least one processor and memory that requests shared services from a server, and with which a user directly interacts. Examples of devices 110-125 include, but are not limited to, personal computers, portable computing or communication devices, network computers, tablet computers, mobile phones, personal digital assistants, set-top boxes, and smart televisions. In the example of FIG. 1, device 110 may be implemented as one type of device, while device 115 is implemented as another different type of device, while device 120 is implemented as yet another different type of device. Device 125 may be implemented as yet another different type of device. Network infrastructure, such as routers, firewalls, switches, and access points are not client devices as the term "client device" is defined herein.

Social networking system 130 is capable of coupling with network 105 through wired and/or wireless communication links. Social networking system 130 is implemented as one or more interconnected computer systems, e.g., servers. As defined herein, a "social networking system" is a computing platform that allows users to build social networks or social relations among people who share similar interests, activities, backgrounds or real-life connections. Through a social networking system, users may communicate through different mechanisms. Examples of these mechanisms can include, but are not limited to, posting messages or other media; commenting on messages, posts, or other media; replying to messages; expressing an emotional sentiment (e.g., "liking") toward a communication or item of media; and sharing a communication or item of media. In the context of social networking system 130, actions such as posting, replying, liking, sharing, expressing sentiment, and commenting (e.g., posting comments) are programmatic actions that are monitored and persisted within social networking system 130, e.g., within a data storage device in a data structure within and/or accessible by, social networking system 130.

In one or more embodiments, social networking system 130 includes a rendering system 135. Rendering system 135 may be implemented as one or more interconnected data processing systems, e.g., servers. Rendering system 135 is capable of communicating with social networking system 130 to obtain content items and comments for content items. In one or more embodiments, rendering system 135 is capable of obtaining data from social networking system 130 such as user requests for content items and/or the posting or creation of a comment for a content item.

Rendering system 135 is capable of rendering content items available within social networking system 130. As an illustrative and non-limiting example, rendering system 135 is capable of dividing content items into a plurality of sections, determining a score for each of the plurality of sections for each of the content items, and presenting content item(s) by applying a visualization technique to one or more of the sections of the content items based upon the score of the respective sections. In particular embodiments, rendering system 135 determines scores for the sections of the content items based upon comments of users for the content items.

In the example of FIG. 1, rendering system 135 is shown as being a part of, or within, social networking system 130. In one or more other embodiments, rendering system 135 is implemented separately from social networking system 130. In that case, rendering system 135 and social networking system 130 are communicatively linked via suitable communication links. Rendering system 135 may communicate with social networking system 130 as described herein through an application programming interface (API) provided by social networking system 130. Further details relating to the architecture and operation of rendering system 135 are provided below in connection with the remaining figures.

As defined within this disclosure, the term "content item" means a Web page that includes comments or that is associated with comments. The term "comment" means alphanumeric characters and/or textual data that is associated with a content item and that is written, created, posted, or submitted by a user other than the user that is the author of the content item. The user that writes, creates, posts, and/or submits a comment may be referred to herein as a "contributor."

In the example of FIG. 1, each of users A, B, C, and D is capable of interacting with social networking system 130 and/or rendering system 135 via a respective one of devices 110, 115, 120, and 125. Each of devices 110-125 is capable of requesting content item 140. As pictured, user A accesses content item 140 through device 110. User A, in response to reading content item 140, submits comment 1 about content item 140 via device 110. User B accesses content item 140 via device 115. User B, in response to reading content item 140, submits comment 2 about content item 140 via device 115. User C accesses content item 140 via device 120. User C, in response to reading content item 140, submits comment 3 about content item 140. As each comment is posted or submitted, the comment becomes associated with, or part of, content item 140 within social networking system 130.

In one or more embodiments, rendering system 135 is capable of dividing the content of content item 140 into different sections shown as sections 1, 2, and 3. Rendering system 135 is capable of analyzing comments 1, 2, and 3 and determining the applicability or relatedness of each of comments 1, 2, and 3 to each of sections 1, 2, and 3 of content item 140. Further, rendering system 135 is capable of determining one or more subject matter domain weights for each of users A, B, and C having made comments on content item 140. Rendering system 135 is capable of calculating a score for each of sections 1, 2, and 3 of content item 140.

Accordingly, in the example of FIG. 1, in response to user D requesting content item 140 via device 125, rendering system 135 is capable of applying different visualization techniques to sections 1, 2, and 3 of content item 140 to create content item 140' based upon the score of each respective section. As user D views content item 140' using device 125, user D is able to see those sections of content item 140' that are deemed to be of greater value (having higher scores) than other sections based upon the particular visualization applied to sections 1, 2, and/or 3 by rendering system 135. Rendering system 135 is capable of applying visualizations to the sections of content item 140 by modifying the program code of content item 140 (e.g., a Web page) thereby generating content item 140'.

FIG. 1 is provided for purposes of illustration and is not intended to limit the inventive arrangements described herein. It should be appreciated that network computing system 100 may include fewer elements than shown or more elements than shown. For example, network computing system 100 may include fewer or more servers, clients, and other devices. In addition, one or more of the elements illustrated in network computing system 100 may be separated. For example, social networking system 130 may be implemented as a separate system from rendering system 135.

Figure 2:
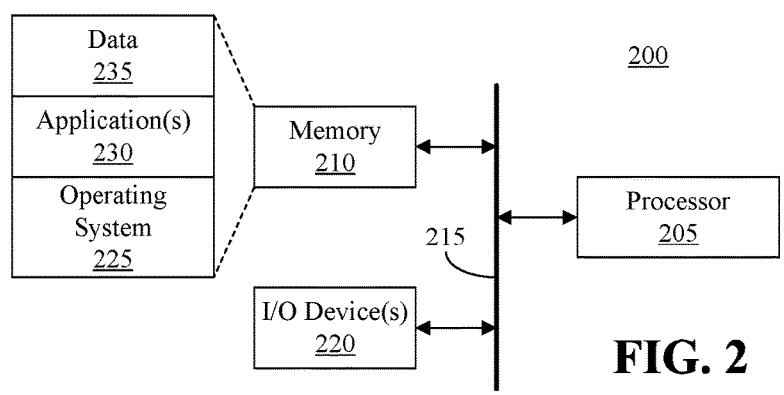
FIG. 2 is an example of an architecture for a data processing system.

FIG. 2 illustrates an example of an architecture 200 for a data processing system (system) for use with one or more embodiments described herein. In an aspect, architecture 200 is implemented as a computer or other system or device that is suitable for storing and/or executing program code.

Architecture 200 includes at least one processor 205. Processor 205 is coupled to memory 210 through interface circuitry 215. Architecture 200 stores computer readable instructions (also referred to as "program code") within memory 210. Memory 210 is an example of computer readable storage media. Processor 205 executes the program code accessed from memory 210 via interface circuitry 215.

Memory 210 includes one or more physical memory devices such as, for example, a local memory and one or more bulk storage devices. The term "local memory" refers to non-persistent memory device(s) generally used during actual execution of the program code. Examples of local memory include random access memory (RAM) and/or any of the various types of RAM that are suitable for use by a processor for executing program code. The term "bulk storage device" refers to persistent data storage devices. Examples of a bulk storage device include a hard disk drive (HDD) and a solid-state drive (SSD). Architecture 200 may also include one or more cache memories (not shown) that provide temporary storage of at least some program code in order to reduce the number of times program code must be retrieved from a bulk storage device during execution.

Examples of interface circuitry 215 include, but are not limited to, an input/output (I/O) subsystem, an I/O interface, a bus system, and a memory interface. For example, interface circuitry 215 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI express (PCIe) bus.

Architecture 200 further may include one or more input/output (I/O) devices 220 coupled to interface circuitry 215. I/O devices 220 may be coupled to architecture 200, e.g., interface circuitry 215, either directly or through intervening I/O controllers. Examples of I/O devices 220 include, but are not limited to, a keyboard, a display device, a pointing device, one or more communication ports, a network adapter, etc. A network adapter refers to circuitry that enables architecture 200 to become coupled to other systems, computer systems, remote printers, and/or remote storage devices through intervening private or public networks. Modems, cable modems, Ethernet cards, and wireless transceivers are examples of different types of network adapters that may be used with architecture 200.

Memory 210 stores one or more program modules. The program modules may generally include routines, programs, objects, components, logic, data structures, and so on. For purposes of illustration, memory 210 stores an operating system 225, one or more application(s) 230, and a data 235. In an aspect, operating system 225 and application(s) 230, being implemented in the form of executable program code, are executed by architecture 200 and, more particularly, by processor 205, to perform the operations described within this disclosure. As such, operating system 225 and application(s) 230 may be considered an integrated part of architecture 200. Further, it should be appreciated that any data used, generated, and/or operated upon by a system implemented using architecture 200 (e.g., processor 205) are functional data structures that impart functionality when employed as part of the system.

Architecture 200 may include fewer components than shown or additional components not illustrated in FIG. 2 depending upon the particular type of device and/or system that is implemented. The particular operating system and/or application(s) included may vary according to device and/or system type as may the types of I/O devices included.

Further, one or more of the illustrative components may be incorporated into, or otherwise form a portion of, another component. For example, a processor may include at least some memory.

As an illustrative example, in the case where architecture 200 is used to implement a server type of data processing system such as social networking system 130 and/or rendering system 135, operating system 225 may be a server-side operating system; and, application 230 may be one or more server-side applications that, when executed, cause the server to perform the various operations described herein. In the case where architecture 200 is used to implement a device such as devices 110-125, operating system 225 may be a client-side operating system; and, application 230 may be a client-side application that, when executed, causes the client to perform the various operations described herein. An example of a client side application is a browser. Further, devices such as mobile devices may include one or more wireless transceivers (e.g., types of network adapters) while other types of data processing systems may not.

Figure 3:
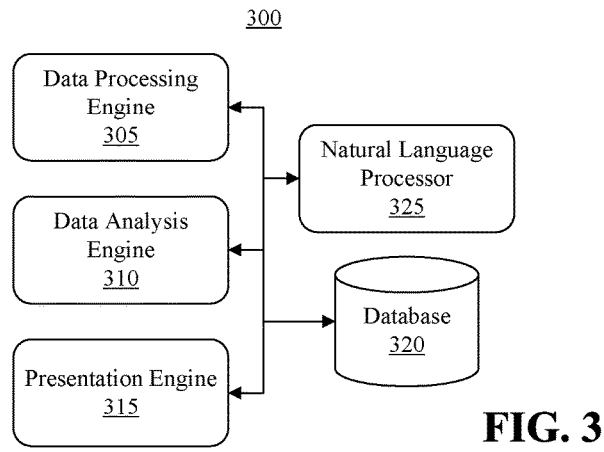
FIG. 3 illustrates an example software architecture that is executable by the rendering system described in connection with FIG. 1.

FIG. 3 illustrates an example software architecture 300 that is executable by rendering system 135 described in connection with FIG. 1. In the example of FIG. 3, software architecture 300 includes a data processing engine 305, a data analysis engine 310, and a presentation engine 315. Data processing engine 305, data analysis engine 310, and presentation engine 315 are communicatively linked with a database 320. Further, architecture 300 can include a natural language processor 325 that is communicatively linked with the respective engines 305, 310, and/or 315, and/or database 320.

In general, data processing engine 305 is capable of recording social media data, valid comment data, and user identification data in database 320. In one or more embodiments, data processing engine 305 is capable of storing the universal resource locators (URLs) for content items shared within social networking system 130 in database 320. Data processing engine 305 is capable of retrieving the content items.

In one or more embodiments, data processing engine 305 is capable of dividing the content items into sections. For example, data processing engine 305 may divide content items into sections based upon detected hard returns within the content item, detecting headings and/or titles in the content item, different types of formatting within the content items, paragraphs within the content item. In another example, data processing engine 305 is capable of semantically dividing the content items into sections. Data processing engine 305 is capable of storing the sections of the content items in database 320.

In one or more embodiments, data processing engine 305 is capable of providing the content item to natural language processor 325 for processing. Natural language processor 325 is capable of performing Natural Language Processing (NLP) on content items and on comments for the content items. NLP is a field of computer science, artificial intelligence, and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency. Natural language processor 325 is further capable of determining a subject matter domain for a given portion of text such as content items and/or comments and/or performing sentiment analysis on content items and comments for the content items.

Natural language processor 325 is capable of semantically processing the content item to identify the subject matter domains contained in the content item. Based upon the results received from natural language processor 325, data processing engine 305 is capable of dividing the content item into different sections. For example, data processing engine 305 each portion the content item that is considered directed to one subject matter domain (e.g., a topic) becomes a section. It should be appreciated that any of a variety of different types of semantic processing such as summarization and/or other techniques for identifying linguistic units may be used to divide content items into sections.

Data processing engine 305 is further capable of detecting the submission, e.g., posting, of comments for content items. For example, in response to detecting a post of a comment for a content item, data processing engine 305 is capable of processing the comment. Data processing engine 305 is capable of creating or storing a record of comments in database 320. In one or more embodiments, data processing engine 305 stores or creates a record for each valid comment in database 320. Data processing engine 305 further may store a user profile or a reference to a user profile of the contributor of each comment stored in database 320.

In one or more embodiments, data processing engine 305 is capable of filtering comments considered to be of little or no value (e.g., meaningless) from use in scoring the sections of the content item. Such comments may be considered "invalid." As an illustrative example, data processing engine 305 is capable of providing the comments for a content item to natural language processor 325 for processing. Data processing system 305 may filter or discard any of the comments for a content item that are determined to be topically unrelated to the content item. For example, if a subject matter domain of a comment is unrelated, e.g., does not match, one or more subject matter domains of the content item, the comment is filtered so as not to be used for purposes of calculating a score of the sections of the content item.

Data analysis engine 310 is capable of determining scores for sections of the content items and storing the scores within database 320. In one or more embodiments, data analysis engine 310 is capable of calculating the scores for sections of content items based upon matching metrics determined for each comment in relation to each section of a content item. For example, based upon results obtained from natural language processor 325 for each section of a content item and for each comment for the content item, data analysis engine 310 is capable of calculating a matching metric for each comment as applied to each section of the content item. As an illustrative and non-limiting example, data analysis engine 310 may determine that while comment 1 is associated with content item 140 in general, comment 1 has a matching metric of 30% for section 1; a matching metric of 10% for section 2; and a matching metric of 80% for section 3 of content item 140. The matching metrics need not total to 100% in the examples provided.

The matching metrics may be calculated based upon whether a determined subject matter domain of a comment matches the subject matter domain of a section of the content item with which the comment is associated. The matching metric may be calculated based upon any semantic data generated for the comment and for the section of the content item from natural language processor 325. For example, the matching metric may be determined by comparing sentiment of a comment with respect to the sentiment of each section of the content item, based upon keyword matching between the comment and the sections of the content item, or using other suitable processing techniques. Data analysis engine 310 is capable of storing the matching metrics within a database 320.

In one or more embodiments, data analysis engine 310 is capable of applying a minimum threshold for matching metrics. For example, data analysis engine 310 is capable of comparing each matching metric with the threshold and, in response to determining that the matching metric for a comment in relation to a section of the content item does not exceed the threshold, may ignore or discard the comment for the section. Referring to the prior example, data analysis engine 310 may use a threshold of 30%. It should be appreciated that the threshold may be higher or lower than the example provided and further may be modified as a system preference. In any case, since comment 1 has a 10% matching metric for section 1 of content item 140, data analysis engine 310 may disregard comment 1 for purposes of determining a score for section 1 of content item 140. For example, data analysis engine 310 may set the matching metric of comment 1 for section 1 of content item 140 to zero.

In one or more embodiments, data analysis engine 310 is capable calculating scores for the sections of content items based upon subject matter domain weights of the users that posted comments for the content items. As an illustrative and non-limiting example, user profiles for users of social networking system 130 may specify a list of subject matter domains in which the user has an expertise or experience. The user profiles may be included in database 320 or may be obtained from another data storage device and/or structure. The amount of experience and/or expertise in each of the subject matter domains listed in the user profiles may be specified or quantified as a subject matter domain weight. For example, user A may have subject matter domain weight of 5 in a first subject matter domain and a subject matter domain weight of 10 in a second and different subject matter domain. The subject matter domains may be specified according to any of a variety of different taxonomies or ontologies.

In particular embodiments, data analysis engine 310 is capable of using the matching metrics and the subject matter domain weights to determine a contribution for each comment to the score of each section of the content item. For example, data analysis engine 310 is capable of multiplying the matching metrics by the subject matter domain weights for each section and summing the results (e.g., the products) to obtain the score for each section. As an illustrative and non-limiting example, data analysis engine 310 may generate the data illustrated below in Table 1 and store the data in database 320. As shown, the same user, e.g., the user that posted comment 1, may have a different subject matter domain weight applied for the different sections of the content item based upon the determined subject matter domain of the comment and/or the applicable section of the content item.

TABLE 1

| Comment | Matching Metric Section 1 | Subject Matter Domain Weight Section 1 | Matching Metric Section 2 | Subject Matter Domain Weight Section 2 | Matching Metric Section 3 | Subject Matter Domain Weight Section 3 |
| --- | --- | --- | --- | --- | --- | --- |
| 1 | 30% | 5 | 10% | N/A | 80% | 10 |
| 2 | 50% | 8 | 0% | N/A | 95% | 9 |
| 3 | 0% | N/A | 30% | 3 | 60% | 7 |

Referring to Table 1, for example, comment 1 from user A has a 30% matching metric to section 1. User A has a subject matter domain weight of 5 for the particular subject matter of section 1. Comment 1 from user A has an 80% matching metric to section 3. User A has a subject matter domain weight of 10 for the particular subject matter of section 3.

In one or more embodiments, data analysis engine 310 is capable of determining a score for each of the sections of the content item. As an illustrative and non-limiting example, data analysis engine 310 may calculate the score for each section by multiplying the matching metric of each comment for the section by the subject matter domain weight for the user that posted the comment. Data analysis engine 310 sums the products to obtain the score for the section. As noted, for those comments determined to have a matching metric less than a predetermined threshold for a particular section, the comments do not contribute to the score for that particular section. For purposes of illustration, data analysis engine 310 may calculate the scores for sections 1, 2, and 3 as follows:

Section 1 Score: 0.3*5+0.5*8+0=5.5
Section 2 Score: 0+0+0.3*3=0.9
Section 3 Score: 0.8*10+0.95*9+0.6*7=20.75

Data analysis engine 310 is capable of refreshing and/or updating the semantic matching data in database 320 responsive to particular events such as the detection of a new comment for a content item. Further, data analysis engine 310 is capable of updating the scores for the sections of the content items as new comments are detected. The score for each of the sections of a content item may be used by data analysis engine 310 and/or presentation engine 315 for purposes of ranking the sections. In one or more embodiments, the ranking is an indication of popularity and/or value of the sections of the content items.

Presentation engine 315 is capable of applying different visualization techniques to different sections of content items in order to quickly illustrate which sections of a given content item are considered more valued or popular based upon the score. In one or more embodiments, presentation engine 315 is of selecting the top "N" sections of a content item that is to be provided (e.g., displayed) to a client device. The value of N is an integer and may be specified as a system setting. In one or more embodiments, the value of N is less than the total number of sections of the content items. For example, the value of N may be set to 1, 2, 3, 4, or 5. Presentation engine is capable of applying a different visualization technique to each of the top N sections of the content item to distinguish each of the top N sections from the other ones of the sections of the content item.

In one or more embodiments, presentation engine 315 is capable of masking the original content item thereby preventing the original content item from being presented or otherwise provided to a requesting device. Presentation engine 315 is capable of applying different visualization techniques to the different sections of the content item and providing the processed version of the content item to the requesting device.

As an illustrative and non-limiting example, presentation engine 315 is capable of applying a visualization technique (e.g., a theme and/or style) that may include different fonts, font colors, different background colors, and/or rich text features to the respective ones of the top N sections of the content item. For example, for the top ranked (highest scored) section, presentation engine 315 is capable of applying a first visualization technique that highlights the section with font color 1 and background color 1. For the second highest ranked section, presentation engine 315 is capable of applying a second and different visualization technique that highlights the section with font color 2 and background color 2. For the third highest ranked section, presentation engine 315 is capable of applying a third and different visualization technique that highlights the section with font color 3 and background color 3, etc., until the Nth highest ranked section is processed.

Figure 4:
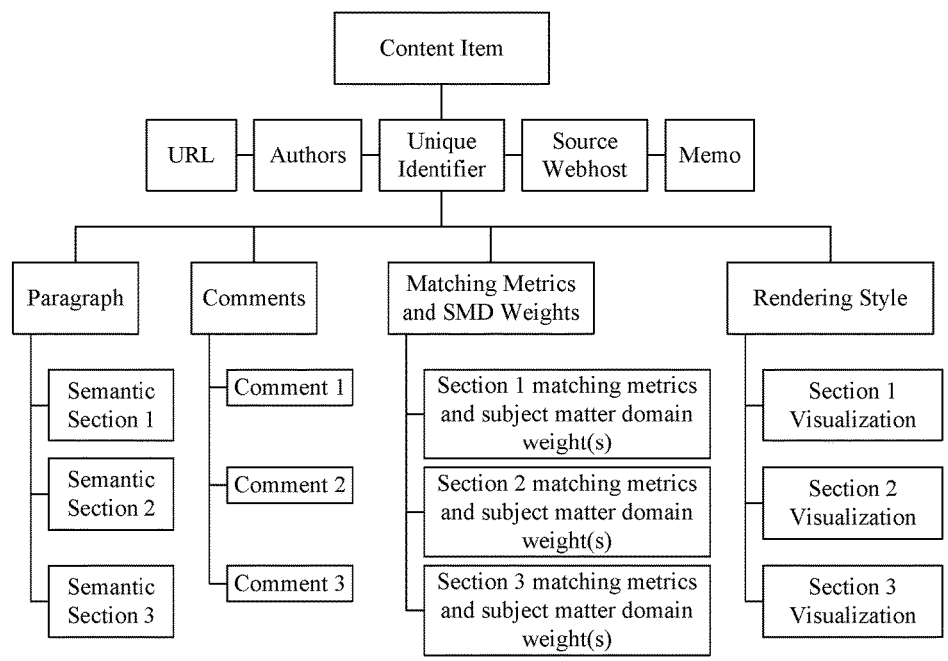
FIG. 4 illustrates an example of a layered database structure.

FIG. 4 illustrates an example of a layered database structure. In one or more embodiments, the example database structure of FIG. 4 may be used to implement database 320 of FIG. 3. As generally described in connection with FIG. 3, database 320 is capable of storing information generated by data processing engine 305, data analysis engine 310, and/or presentation engine 315.

In the example of FIG. 4, the layered database structure includes three different layers. The first or top layer is the content item. The second or middle layer includes data such as the URL of the content item, authors of the content item, a unique identifier for the content item, a source web host for the content item, and a memo field. The third or lowest layer may be used by the various engines described in connection with FIG. 3 to store and/or access data. For example, data processing engine 305 may store the various sections of the content item beneath the paragraph portion of the data structure. Data processing engine 305 may store comments for the content item is beneath the comments portion of the data structure. Data analysis engine 310 may store various matching metrics and subject matter domain weights for users correlated among the different sections of the content item in the various comments for the content item. Presentation engine 315 may access the particular visualization to be applied to the respective sections of the content item from beneath the rendering style portion of the data structure.

Figure 5:
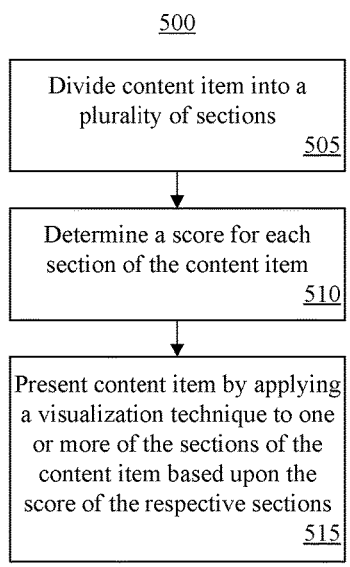
FIG. 5 illustrates an example method of rendering content items for a social networking system.

FIG. 5 illustrates an example method 500 of rendering content items for a social networking system. Method 500 may be performed by a system such as the rendering system and/or the social networking system as described herein. It should be appreciated that while FIG. 5 is described with reference to a particular content item, the system is capable of performing the processing described across a plurality, e.g., many, a group, a subset, or all, content items of the social networking system.

In block 505, the system divides a content item into a plurality of sections. As discussed, the data processing engine is capable of dividing the content item into sections based upon paragraphs, headings, formatting, and/or a semantic analysis as may be performed using a natural language processor. It should be appreciated that regardless of the manner in which the content item is divided into sections, the data analysis engine is capable of invoking the natural language processor on the content item, or sections thereof, in order to determine the subject matter domain and other attributes of each section.

In block 510, the system determines a score for each of the plurality of sections of the content item. The score is determined based upon comments for the content item. As discussed, the score for each section of the content item may be determined based upon subject matter domain weights for users that posted the comments for the content item and/or a matching metric indicating the degree or amount each comment relates to each particular section of the content item.

In block 515, the system presents the content item by applying a visualization technique to one or more or all of the sections of the content item based upon the score of the respective sections. For example, the presentation engine is capable of modifying the formatting of the Web page (content item) to highlight and distinguish sections according to score. The presentation engine is capable of applying a pre-defined visualization technique to the various sections based upon the scores of the respective sections. A visualization technique may specify attributes including, but not limited to, one or more rich text features (e.g., bold, underline, italics), font, font color, font size, and/or background color. In one or more embodiments, the visualization techniques may be customized by a user. Thus, while the score of different sections of the content item remains the same whether the content item is requested presented to user A or to user B, the particular visualizations applied to the different sections may differ between user A and user B based upon user specified preferences.

In particular embodiments, the presentation engine is capable of dynamically rendering the sections of the content item in response to a request for the content item received from a requesting device.

Figure 6:
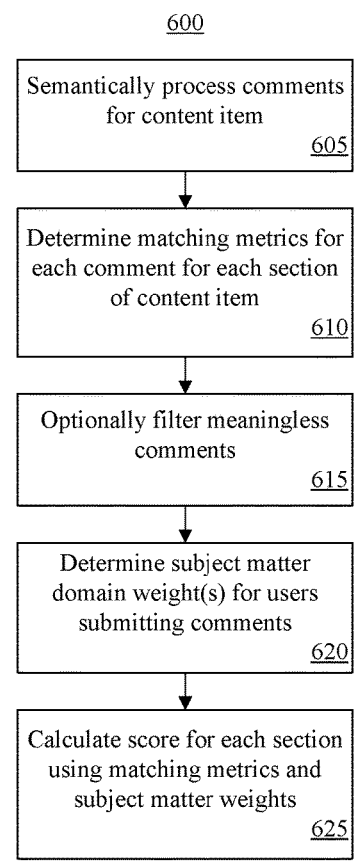
FIG. 6 illustrates an example method of determining scores for sections of a content item.

FIG. 6 illustrates an example method 600 of determining scores for sections of a content item. In one or more embodiments, block 510 of FIG. 5 may be implemented using method 600.

In block 605, the system semantically processes comments for the content item. The data analysis engine, for example, is capable of invoking the natural language processor to determine the subject matter domain of each comment and/or any of the other parameters noted herein that may be determined by a natural language processor.

In block 610, the system determines matching metrics for each comment for each section of the content item. For example, the data analysis engine is capable of determining a matching metric for each comment in relation to each section of the content item. As an illustrative and non-limiting example, the system may determine that comment 3 for content item 140 has a matching metric of 0% for section 1 of content item 140. Thus, the subject matter domain of comment 3 is unrelated to the subject matter domain of section 1. The system may determine that comment 3 for content item 140 has a matching metric of 30% for section 2 of content item 140. Thus, the subject matter domain of comment 3 is approximately 30% related to the subject matter domain of section 1. The system may determine that comment 3 for content item 140 has a matching metric of 60% for section 3 of content item 140. Thus, the subject matter domain of comment 3 is approximately 60% related to the subject matter domain of section 1. The higher the matching metric the greater the relatedness or match of the comment to the particular section.

In general, the matching metric indicates how well a given comment matches a given section of the content item. In one or more embodiments, a matching metric may be determined based upon the distance between the subject matter domain of a comment and the subject matter domain of a section of a content item within a taxonomy and/or an ontology. In one or more embodiments, the matching metric may be determined based upon the number of keywords of a subject matter domain of a section of a content item that are found in a comment. Other semantic processing techniques for scoring relatedness of different texts may be used.

In block 615, the system optionally filters meaningless comments. In one or more embodiments, the system is capable of applying a threshold to the matching metrics to remove or filter meaningless comments from consideration. The analysis engine, for example, is capable of comparing each of the matching metrics with a threshold. In response to determining that the matching metric for a comment as applied to a particular section does not exceed the threshold, the data analysis engine removes the comment from consideration in calculating the score for the section. For example, in response to the comparisons, the data analysis engine prevents comment 1 from contributing to the score of section 2, prevents comment 2 from contributing to the score of section 2 , and prevents comment 3 from contributing to the score of section 1. In one or more embodiments, the data analysis engine sets the matching metrics that do not exceed the threshold to zero.

In block 620, the system determines subject matter domain weights for the users that submitted comments for the content item. For each section of the content item, the data analysis engine is capable of determining which of the comments matches or is correlated with the section. For each of the comments, the data analysis engine determines a subject matter domain weight of the contributor of the comment given the subject matter domain of the section. For example, user A may contribute comment 1 for content item 140. Comment 1 has a 30% matching metric for section 1. The data analysis engine determines that, based upon the semantic analysis of section 1 and user A's profile, user A has a subject matter domain weight of 5 for the subject matter domain of section 1. Comment 1 has an 80% matching metric for section 3. The data analysis engine determines that, based upon the semantic analysis of section 3 and user A's profile, user A has a subject matter domain weight of 10 for the subject matter domain of section 3.

In block 625, the system calculates a score for each section of the content item using the matching metrics and the subject matter domain weights. For each section of the content item, the data analysis engine multiplies each matching metric with each corresponding subject matter domain weight. The products for each section are summed to determine a score for each section of the content item. For example, the system is capable of calculating a score for each section based upon the matching metric of each of the plurality of comments to the section and the subject matter domain weight of the user that made each respective comment relative to the section.

Figure 7:
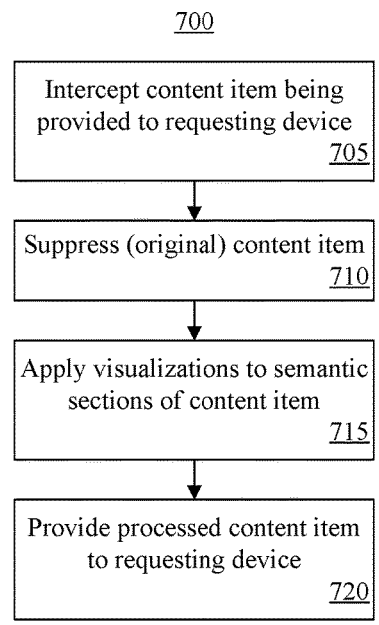
FIG. 7 illustrates an example method of presenting a content item.

FIG. 7 illustrates an example method 700 of presenting a content item. In one or more embodiments, block 515 of FIG. 5 may be implemented using method 700. Method 700 may be performed by the rendering system. In one or more embodiments, method 700 may be performed by the presentation engine.

In block 705, the system intercepts the content item being provided to a requesting device. For example, a user of the social networking system may request the content item via a device. The presentation engine is capable of intercepting the content item prior to delivery of the content item to the requesting device. In block 710, the system suppresses the content item. For example, the presentation engine prevents the original (e.g., unformatted) content item from being provided or sent to the requesting device.

In block 715, the system applies one or more visualizations to the sections of the content item. For example, the presentation engine is capable of dynamically modifying the code of the content item (e.g., Web page) so that one or more sections of the content item are displayed using different visualization techniques selected from a plurality of visualization techniques based upon the score of each respective section.

As an illustrative and non-limiting example, the presentation engine may have N different visualizations for sections ranked from most important to least important as 1 to N. The presentation engine applies visualization 1 to the top ranked (highest scored) section of the content item. The presentation engine applies visualization 2 to the second highest ranked section of the content item, and so on.

In block 720, the system provides the processed content item to the requesting device. For example, the presentation engine is capable of serving the modified content item to the requesting device. Accordingly, when the modified content item is received by the requesting device, those sections of the content item that were scored highly or in the top N can be visually discerned from other sections of the content item. Further, the ranking of the top N sections may be visually discernable from the visualizations that are applied.

In accordance with the inventive arrangements described within this disclosure, a system is capable of analyzing the content of a content item such as a Web page. The system is capable of applying visualizations to different sections of the content item to indicate to users which section(s) of the content item is/are considered greater in value and/or are recommended by persons considered to be knowledgeable and/or have expertise in the relevant subject matter domains of the various sections.

Figure 8:
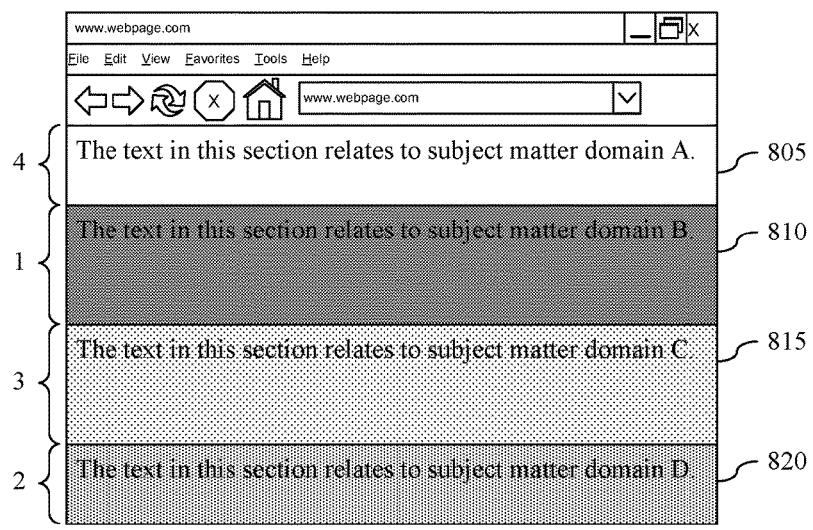
FIG. 8 illustrates an example of a content item with visualizations applied thereto.

FIG. 8 illustrates an example of a content item with visualizations applied thereto. In the example of FIG. 8, the content item (e.g., Web page) is rendered by a browser in a requesting device after being reformatted and/or reprocessed by the rendering system. In the example shown, the content item includes sections 805, 810, 815, and 820. The rankings, based upon the score of each respective section, is shown on the left. Section 810 is ranked number 1. The visualization applied to section 810 changes the background color and/or texture in this example and indicates the number 1 ranking of section 810. Section 820 is ranked number 2. The visualization applied to section 820 changes the background color and/or texture in this example and indicates the number 2 ranking of section 820. Section 815 is ranked number 3. The visualization applied to section 815 changes the background color and/or texture in this example and indicates the number 3 ranking of section 815. Section 805 has no visualization applied thereto. As such, section 805 is not within the top N ranked sections. In the example of FIG. 8, N is set to 3 so that no more than three sections of a content item have visualizations applied thereto. Appreciably, N may be set to a value larger or smaller than 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount or tolerance of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
dividing a content item into a plurality of sections;
identifying a plurality of comments for the content item;
generating a score for each of the plurality of sections;
matching, for each of the plurality of comments, a particular one of the plurality of comments to a particular one of the plurality of sections based upon a particular a score for the particular one of the plurality of sections;
applying a particular visualization technique to the particular one of the plurality of sections, wherein
the particular visualization technique is chosen from a plurality of visualization techniques based upon a ranking of the particular one of the plurality of sections relative to others of the plurality of sections,
the ranking uses the generated scores for the plurality of sections, and
the matching is also based upon a relatedness of the particular one of the plurality of comments to the particular one of the plurality of sections.

2. The method of claim 1, wherein
the generated scores for the plurality of sections are based upon a semantic analysis of the plurality of sections and the plurality of comments and generates a matching metric between each of the plurality of comments and each of the plurality of sections.

3. The method of claim 2, wherein
the matching metric between any particular one of the plurality of comments and any particular one of the plurality of sections is based upon a subject matter domain weight, and
the subject matter domain weight is calculated using a comparison between the any particular one of the plurality of sections and a profile of a contributor of the any particular one of the plurality of comments.

4. The method of claim 3, wherein
a score for the any particular one of the plurality of sections is based upon:
a summation, for each of the plurality of comments matched to the any particular one of the plurality of sections, of a matching metric for each of the plurality of comments matched to the any particular one of the plurality of sections multiplied by a subject matter domain weight respectively associated with a contributor of each of the plurality of comments matched to the any particular one of the plurality of sections.

5. The method of claim 1, wherein
the applying the visualization technique modifies a program code of the content item.

6. The method of claim 1, wherein
a single comment of the plurality of comments contributes to scores, respectively, of at least two of the plurality of sections.

7. A computer hardware system, comprising:
a hardware processor configured to initiate the following executable operations:
dividing a content item into a plurality of sections;
identifying a plurality of comments for the content item;
generating a score for each of the plurality of sections;
matching, for each of the plurality of comments, a particular one of the plurality of comments to a particular one of the plurality of sections based upon based upon a score for the particular one of the plurality of sections;
applying a particular visualization technique to the particular one of the plurality of sections, wherein
the particular visualization technique is chosen from a plurality of visualization techniques based upon a ranking of the particular one of the plurality of sections relative to others of the plurality of sections,
the ranking uses the generated scores for the plurality of sections, and
the matching is also based upon a relatedness of the particular one of the plurality of comments to the particular one of the plurality of sections.

8. The system of claim 7, wherein
the generated scores for the plurality of sections are based upon a semantic analysis of the plurality of sections and the plurality of comments and generates a matching metric between each of the plurality of comments and each of the plurality of sections.

9. The system of claim 8, wherein
the matching metric between any particular one of the plurality of comments and any particular one of the plurality of sections is based upon a subject matter domain weight, and
the subject matter domain weight is calculated using a comparison between the any particular one of the plurality of sections and a profile of a contributor of the any particular one of the plurality of comments.

10. The system of claim 9, wherein
a score for the any particular one of the plurality of sections is based upon:
a summation, for each of the plurality of comments matched to the any particular one of the plurality of sections, of a matching metric for each of the plurality of comments matched to the any particular one of the plurality of sections multiplied by a subject matter domain weight respectively associated with a contributor of each of the plurality of comments matched to the any particular one of the plurality of sections.

11. The system of claim 7, wherein
the applying the visualization technique modifies a program code of the content item.

12. The system of claim 7, wherein
a single comment of the plurality of comments contributes to scores, respectively, of at least two of the plurality of sections.

13. A computer program product, comprising:
a computer readable storage medium having program instructions stored therein,
the program instructions, which when executed by a computer hardware system, cause the computer hardware system to perform:
dividing a content item into a plurality of sections;
identifying a plurality of comments for the content item;
generating a score for each of the plurality of sections;
matching, for each of the plurality of comments, a particular one of the plurality of comments to a particular one of the plurality of sections based upon based upon a score for the particular one of the plurality of sections;
applying a particular visualization technique to the particular one of the plurality of sections, wherein
the particular visualization technique is chosen from a plurality of visualization techniques based upon a ranking of the particular one of the plurality of sections relative to others of the plurality of sections,
the ranking uses the generated scores for the plurality of sections, and
the matching is also based upon a relatedness of the particular one of the plurality of comments to the particular one of the plurality of sections.

14. The computer program product of claim 13, wherein
the generated scores for the plurality of sections are based upon a semantic analysis of the plurality of sections and the plurality of comments and generates a matching metric between each of the plurality of comments and each of the plurality of sections.

15. The computer program product of claim 14, wherein
the matching metric between any particular one of the plurality of comments and any particular one of the plurality of sections is based upon a subject matter domain weight, and
the subject matter domain weight is calculated using a comparison between the any particular one of the plurality of sections and a profile of a contributor of the any particular one of the plurality of comments.

16. The computer program product of claim 15, wherein
a score for the any particular one of the plurality of sections is based upon:
a summation, for each of the plurality of comments matched to the any particular one of the plurality of sections, of a matching metric for each of the plurality of comments matched to the any particular one of the plurality of sections multiplied by a subject matter domain weight respectively associated with a contributor of each of the plurality of comments matched to the any particular one of the plurality of sections.

17. The computer program product of claim 13, wherein
the applying the visualization technique modifies a program code of the content item.

18. The computer program product of claim 13, wherein
a single comment of the plurality of comments contributes to scores, respectively, of at least two of the plurality of sections.

* * * * *